US012697955B2

(12) United States Patent
Backes et al.

(10) Patent No.: US 12,697,955 B2
(45) Date of Patent: Aug. 4, 2026

(54) ELECTRO-HYDRAULIC VALVE FOR PROPORTIONAL CONTROL OF SPRING APPLY HYDRAULIC RELEASE (SAHR) BRAKES

(71) Applicant: ZF OFF-HIGHWAY SOLUTIONS MINNESOTA INC, North Mankato, MN (US)

(72) Inventors: Peter Backes, North Mankato, MN (US); Bryce Tillman, North Mankato, MN (US)

(73) Assignee: ZF OFF-HIGHWAY SOLUTIONS MINNESOTA INC., North Mankato, MN (US)

( * ) Notice: Subject to any disclaimer, the term of this patent is extended or adjusted under 35 U.S.C. 154(b) by 868 days.

(21) Appl. No.: 18/066,330

(22) Filed: Dec. 15, 2022

(65) Prior Publication Data

US 2024/0198992 A1 Jun. 20, 2024

(51) Int. Cl.
B60T 13/68 (2006.01)
B60T 13/22 (2006.01)
(Continued)

(52) U.S. Cl.
CPC .......... B60T 15/028 (2013.01); B60T 13/686 (2013.01); F16K 31/0668 (2013.01); F16K 31/30 (2013.01); *F16K 2200/305* (2021.08)

(58) Field of Classification Search
CPC ...... B60T 13/22; B60T 15/028; B60T 13/686; F16K 31/0668; F16K 31/30; F16K 2200/305
See application file for complete search history.

(56) References Cited

U.S. PATENT DOCUMENTS 3,999,075 A   12/1976   Johnson et al.
4,305,623 A   12/1981   Seabase
(Continued)

FOREIGN PATENT DOCUMENTS

CN   101506017 A   8/2009
DE   1064362 B   9/1956
(Continued)

OTHER PUBLICATIONS

European Patent Office, International Search Report and Written Opinion issued in International patent application No. PCT/IB2023/059624 (Dec. 14, 2023).

(Continued)

*Primary Examiner* — Thomas W Irvin
(74) *Attorney, Agent, or Firm* — Secant IP, PLLC

(57) ABSTRACT

Disclosed is an electro-hydraulic relay valve and corresponding valve assembly for a SAHR brake. First actuators are arranged to act on a first end of a floating valve spool and second actuators are arranged to act on a second end of the valve spool. One of the second actuators can receive hydraulic pressure from a pilot valve. In a first valve position, the pressure supply port communicates with the working port and the tank port is closed. In a second valve position, the pressure supply port is closed and communicates via a first sense line with one of the first actuators, the working port directs pressure to the tank port, the tank port communicates via a second sense line with another of the first actuators, and the working port communicates via a third sense line with one of the second actuators. In a central position, all three ports are closed.

15 Claims, 5 Drawing Sheets

(51) Int. Cl.
    *B60T 15/02*     (2006.01)
    *F16K 31/06*     (2006.01)
    *F16K 31/30*     (2006.01)

(56)           References Cited

U.S. PATENT DOCUMENTS

| | | | |
|---|---|---|---|
| 4,813,518 A | 3/1989 | Akiyama et al. | |
| 6,038,858 A | 3/2000 | Mies | |
| 6,312,060 B1 | 11/2001 | Lipscomb et al. | |
| 8,696,070 B2 * | 4/2014 | Costaz | B60T 13/168 |
| | | | 303/3 |
| 9,061,668 B2 * | 6/2015 | Dabbs | B60T 8/17 |
| 11,125,254 B2 * | 9/2021 | Erikksson | F15B 13/0435 |
| 11,192,535 B2 * | 12/2021 | Lemaitre | B60T 7/20 |
| 11,231,053 B2 * | 1/2022 | Eriksson | F15B 11/042 |
| 11,938,913 B2 * | 3/2024 | Haverkamp | B60T 11/21 |
| 2005/0231033 A1 | 10/2005 | Ganzel | |
| 2006/0081121 A1 | 4/2006 | Dixen et al. | |
| 2008/0284242 A1 | 11/2008 | Ganzel | |
| 2014/0225426 A1 * | 8/2014 | Dabbs | B60T 13/662 |
| | | | 303/10 |
| 2021/0254637 A1 | 8/2021 | Eriksson et al. | |
| 2021/0396286 A1 | 12/2021 | Davis et al. | |
| 2022/0048488 A1 | 2/2022 | Haverkamp et al. | |
| 2022/0105911 A1 * | 4/2022 | Haverkamp | B60T 8/17551 |
| 2025/0033618 A1 | 1/2025 | Prahl et al. | |

FOREIGN PATENT DOCUMENTS

| | | | |
|---|---|---|---|
| EP | 1028044 A1 | 8/2000 | |
| EP | 3835154 A1 | 6/2021 | |
| EP | 3 832 033 A1 | 9/2021 | |
| GB | 184088 | 8/1922 | |
| GB | 518288 A | 2/1940 | |
| GB | 1592937 A | 7/1981 | |
| GB | 1595398 A | 8/1981 | |
| JP | S56-167903 A | 12/1981 | |
| SE | 1400431 | 3/2015 | |
| WO | WO-2024127100 A1 * | 6/2024 | F16K 31/30 |

OTHER PUBLICATIONS

United States Patent Office, Non-Final Office Action issued in U.S. Appl. No. 18/357,706 (mailed Dec. 17, 2025).

Hafner-Pneumatik Kramer KG, Chapter 5: ISO Schemes of directional control valves, available at http://www.hafner-pneumatik.com/pneumatic-training-course?lang=en (accessed Dec. 5, 2022).

Carlisle Brake & Friction, Brake systems for mining equipment (2016).

hydraulicsonline.com, Valve Symbols—p. 3 (May 14, 2019).

Gannon, Mary, FluidPowerWorld.com, "Hydraulic symbology 302—high response valves" (Jan. 17, 2020).

European Patent Office, International Preliminary Report on Patentability issued in International patent application No. PCT/US2024/039104 (Feb. 5, 2026).

European Patent Office, Extended European Search Report issued in European Patent application No. 25204549.7 (Mar. 20, 2026).

\* cited by examiner

ELECTRO-HYDRAULIC VALVE FOR PROPORTIONAL CONTROL OF SPRING APPLY HYDRAULIC RELEASE (SAHR) BRAKES

TECHNICAL FIELD

The present disclosure relates generally to hydraulic braking systems for large vehicles and more particularly to an electro-hydraulic valve for proportional control of SAHR brakes.

BACKGROUND

In the automotive industry, brake-by-wire technology uses electrical means to control brake function. For example, a vehicle with brake-by-wire system has a set of actuators near each wheel to produce braking pressure, where the actuators are powered by permanent magnet DC electric motors. Brake-by-wire systems replace traditional brake components, such as pumps, hoses, and belts. Brake-by-wire systems can be used in passenger cars, trailers, and industrial equipment, to name a few examples.

One such brake-by-wire system is known as Spring Apply Hydraulic Release (SAHR) brakes, which are commonly used in heavy-duty industrial applications. SAHR brakes are designed to decelerate inertia loads or to park static loads when the release mechanism is either intentionally or accidentally turned off, for example, in the case of power failure. For example, a spring in the cylinder maintains braking pressure until the braking mechanism is released or disengaged using a hydraulic valve. SAHR brakes can be used as service brakes and as parking brakes. In emergencies, pressure to the SAHR brakes is dumped rapidly, allowing the spring to engage the brake mechanism and stop the machine.

SUMMARY

Valves are known for SAHR brake applications, but the pressure drop through existing valves is too high for large brakes found in industrial machines. For example, underground mining and road construction vehicles can have a brake disc with a diameter of 24 inches or greater. Therefore, a need exists for improvements to braking systems for large vehicles, particularly braking systems utilizing SAHR brakes.

The present disclosure addresses this need and others by providing an electro-hydraulic relay valve, hydraulic valve assembly, and a braking system utilizing the same. In one example, a proportional pressure control pilot valve is provided in combination with a hydraulic relay valve, where the pilot valve is used to control actuation of the relay valve, and a braking system including these valves. In accordance with some embodiments, the pilot valve and relay valve can be used with SAHR brakes, such as those used in industrial equipment. In the event of power loss, the relay valve assumes its basic position, allowing the SAHR brake to dump pressure to the tank and engage the brake to stop the vehicle.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the disclosed subject matter.

Figure 1A:
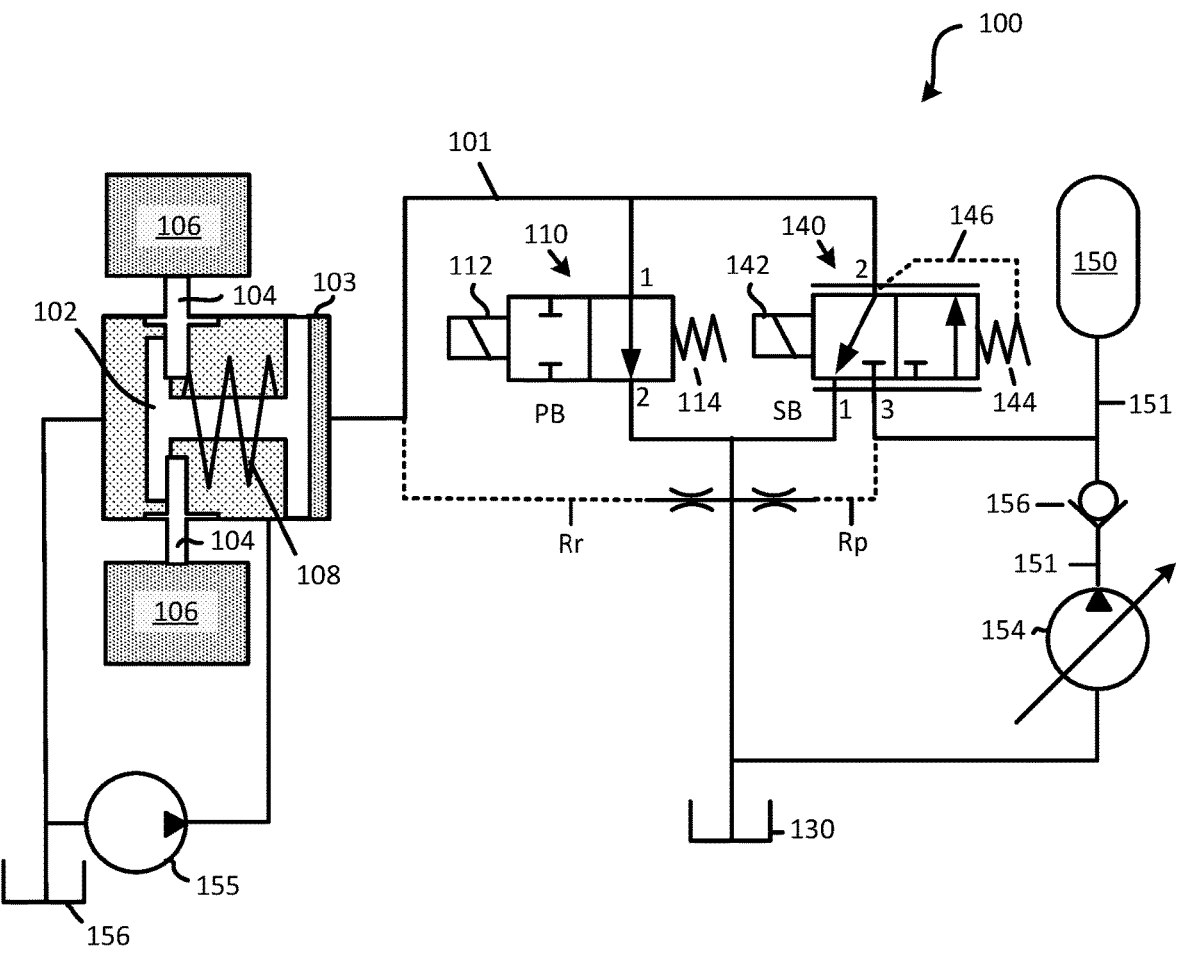
FIG. 1A schematically illustrates an electro-hydraulic brake system with the brake in an engaged position, in accordance with the prior art.

The figures depict various embodiments of the present disclosure for purposes of illustration only. Numerous variations, configurations, and other embodiments will be apparent from the following detailed discussion.

DETAILED DESCRIPTION

Disclosed is an electro-hydraulic relay valve and a corresponding valve assembly for a SAHR brake. In accordance with one embodiment, the relay valve has a floating valve spool movable between a first valve position, a second valve position, and a center valve position using hydraulic actuation and spring return. The relay valve defines a tank port, a working port, and a pressure supply port. First actuators are arranged to act on a first end of the floating valve spool and second actuators are arranged to act on an opposite second end of the floating valve spool. One of the second actuators is configured and arranged to receive hydraulic pressure from a pilot valve. For example, a sense line from the pilot valve is used to control actuation of one of the second actuators. When in the first valve position, the pressure supply port communicates with the working port and the tank port is closed. When in the second valve position, the pressure supply port is closed and the pressure supply port communicates via a first sense line with one of the first actuators, the working port directs pressure to the tank port, the tank port communicates via a second sense line with another of the first actuators, and the working port communicates via a third sense line with one of the second actuators. When in a central position, the first port, the second port, and the third port are closed.

The relay valve can be provided in combination with the pilot valve. In one embodiment, the pilot valve has a pilot valve spool operable between a first position, a second position, and a center position. The pilot valve defines a tank port, a pressure supply port, and a working port, and includes a solenoid actuator configured to act on a first end of the pilot valve spool, a return spring acting on a second end of the pilot valve spool, and a hydraulic actuator configured to act on a second end of the pilot valve spool based on pressure at the working port when the pilot valve spool is in the second position. When in the first position, the tank port is closed, the pressure supply port communicates with the working port, and the working port communicates with one of the second actuators of the relay valve. When in the second position, the pressure supply port is closed, the working port communicates with the tank port, and the working port communicates via a pilot sense line with the hydraulic actuator on the second end of the valve spool.

When in the center position, the tank port, the pressure supply port, and the working port are closed.

The relay valve and the pilot valve can be provided as part of a hydraulic assembly for a SAHR brake, such as a brake on an industrial vehicle. In some embodiments, the relay valve and pilot valve are part of a single valve manifold.

Overview

Direct-operated control valves exist for SAHR brake applications. However, the pressure drop through these valves is too high for the large brakes used by underground mining vehicles and the like. Therefore, a need exists for improvements to braking systems for large vehicles. It would also be desirable to reduce hysteresis in SAHR braking systems.

The present disclosure addresses this need and others by providing an electro-hydraulic relay valve that can be controlled with a pilot valve. In one embodiment, the relay valve has a bias spring or return spring of significantly reduced spring force, in contrast to other valves that have a return spring with a spring force equal to that of pressure needed to fully disengage the SAHR brakes. The reduced spring force of the return spring enables the relay valve to operate with lower hysteresis because the spring provides a spring force that is about 2% of that needed to fully disengage the SAHR brakes, compared to 100% for existing approaches.

A relay valve and valve assembly according to the present disclosure is configured to drain brake pressure to the tank when the valve is in a basic position or a non-energized state. The relay valve is controlled in part by a pilot line from a pilot valve. For example, the pilot valve is an electro-hydraulic proportional control valve with a solenoid actuator and spring return. The valve assembly contrasts other configurations that have a pressure supply line connected directly to the SAHR brake (i.e., without going through a directional control valve) and including a check valve in that pressure supply line that enables brake pressure to vent. A brake system according to the present disclosure does not need a check valve because the relay valve is configured to rapidly dump brake pressure to the tank in the event of power loss, for example, causing the SAHR brakes engage and stop the vehicle.

It is possible to use different types of electro-hydraulic pilot valves. In some embodiments, the pilot valve controls pilot pressure using a fixed orifice and a variable orifice. This configuration may be referred to as a flow divider. In such an embodiment, pilot valve may best operate with a quiescent flow. Also, in some embodiments, the pilot valve may be sensitive to particulate contamination and therefore can benefit from upstream filtration.

In one example, an electro-hydraulic control valve has screw-in cartridge valves. In one such embodiment, the braking system uses an electro-hydraulic pilot valve integrated with a slave section for normal control of service braking. The braking system also includes a check valve to allow flow in the reverse direction through the pressure supply line.

Advantageously, and in accordance with an embodiment of the present disclosure, a control valve electro-hydraulically controls brake pressure with low hysteresis, has low parasitic leakage, and has sufficient flow capacity to engage the SAHR brakes under normal operating conditions as well as during emergency situations when the supply pressure is dumped. Brake systems according to the present disclosure are particularly useful for large equipment with SAHR brakes. In addition to mining vehicles and road construction vehicles, a brake system according to the present disclosure can be used in all off-highway vehicles that have SAHR brakes.

Note that a relay valve as discussed herein is not restricted to that terminology and alternately can also be referred to as a pressure control valve, a brake valve, or an electro-hydraulic brake valve (EBV). Additionally, a pilot valve as discussed herein can alternately be referred to simply as an electro-hydraulic directional control (DC) valve or a flow divider.

Further advantages will be apparent from the following detailed description.

EXAMPLE EMBODIMENTS

Figure 1B:
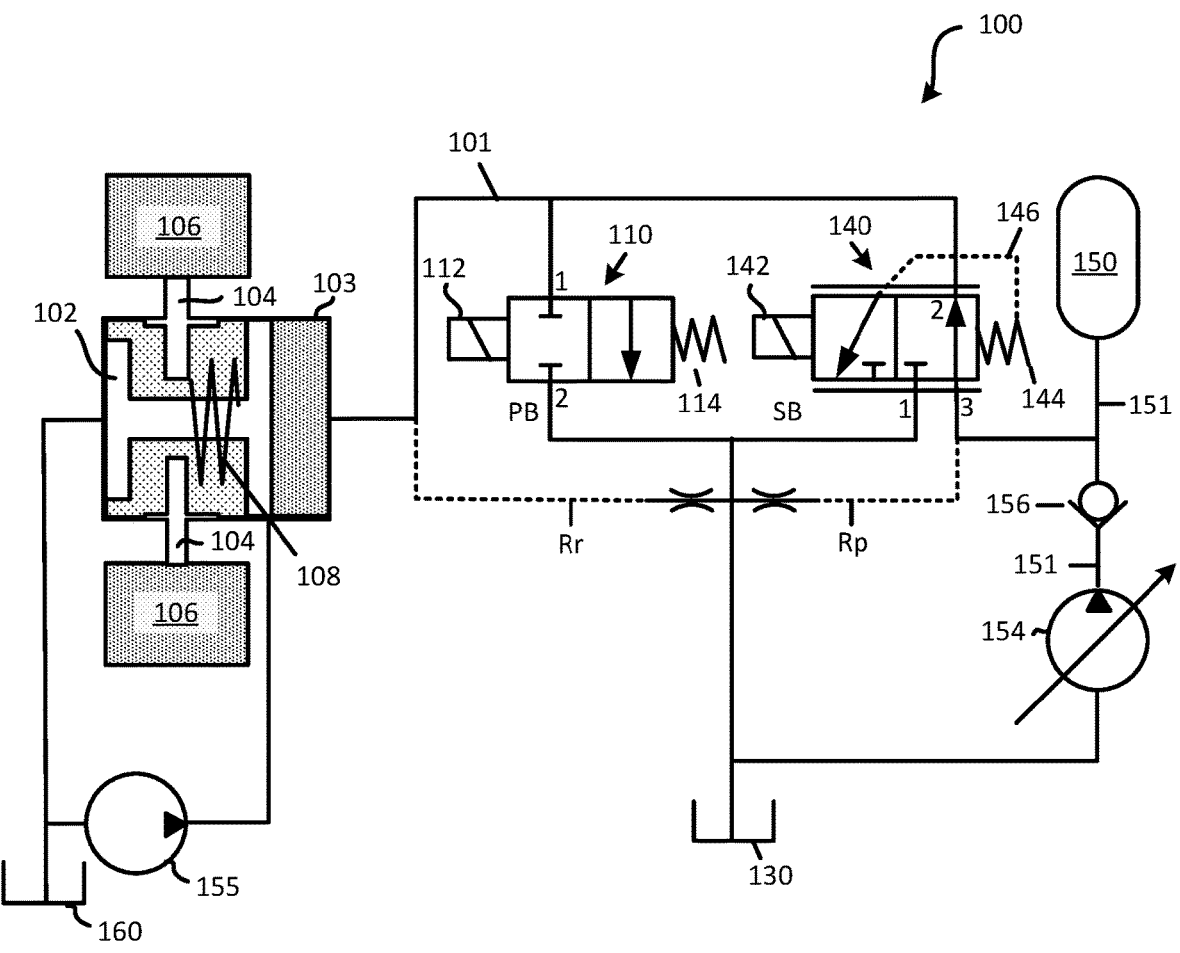
FIG. 1B schematically illustrates the brake system of FIG. 1A with the brake in a released position.

FIGS. 1A and 1B schematically show a brake system 100, in accordance with the prior art. In FIG. 1A, the brake 102 is shown in an engaged position and in FIG. 1B, the brake 102 is shown in a released or disengaged position. The brake 102 is configured as a spring-applied hydraulically released (SAHR) brake where the brake 102 is engaged unless released by application of hydraulic pressure to the brake cylinder 103. The brake 102 operates by contact with discs or the like that are coupled to axles 104, so that actuation of the brake 102 stops or slows the movement of tires 106. In the event of pressure loss to the brake cylinder 103, the spring 108 causes the brake 102 to engage and stop the vehicle.

The brake system 100 includes a first valve 110 and a second valve 140 configured and arranged to operate (e.g., release) the brake 102. The brake system 100 further includes a pressure accumulator 150 supplied with pressure by a variable pump 154. A check valve 156 is between the variable pump 154 and the pressure accumulator 150, allowing pressure to flow from the pump 154 to the pressure accumulator 150 and/or to the second valve 140. In one example, the pressure accumulator 150 is pressurized to about 160 bar for operation of the brake 102. In one embodiment, the brake 102 is fully disengaged when pressure in the brake cylinder 103 is about 110 bar, brake disc contact occurs when pressure in the brake cylinder 103 is about 90 bar, and maximum braking occurs when pressure in the brake cylinder 103 is 0 bar. That is, at 0 bar pressure in the cylinder 103, the spring 108 is not opposed and applies its maximum braking force. A fixed pump 155 circulates cooling oil from the oil reservoir 160 through the brake cylinder 103. Parasitic leakage from the brake system 100 is illustrated schematically by line Rr from the brake cylinder 103 and line Rp from the second valve 140. Leakage Rr and Rp preferably are small.

The first valve 110 (e.g., parking brake valve) is a 2-port, 2-position directional control (DC) valve that is normally open (NO). The first valve 100 has a solenoid actuator 112 and a spring return 114. The first valve 110 is operable to control the parking brake, in accordance with some embodiments. In the basic position or normally open state of the first valve 110, the first valve 110 is open to dump pressure from the brake 102 to the tank. In doing so, the spring 108 moves the brake 102 into engagement and displaces hydraulic fluid from the brake cylinder 103 to port 1 and through the first valve 110 to port 2, which dumps pressure to the tank 130. This action sets the parking brake. In its actuated position, port 1 and port 2 of the first valve 110 are closed. In such closed position, the brake 102 functions as a service brake as determined by the position of the second valve 140.

The second valve 140 (e.g., service brake valve) is configured as a proportional 3-port, 2-position (2/2) directional control valve that is normally open (NO) and has a solenoid actuator 142 and spring return 144. The second valve 140 controls the service brake, in accordance with some embodiments. The second valve 140 includes a sense line 146, which returns exhaust pressure from the spring 144 to the valve body. In its actuated condition, pressurized air can flow from port 2 through the valve to port 1 and to the tank 130, exhausting pressure in the brake cylinder 103 to the tank 130 and applying the service brake. In its basic condition, supply pressure is provided from the pressure accumulator 150 to port 3 and passes through the second valve 140 to port 2 and to the brake cylinder 103, thereby releasing the service brake in an amount proportional to the brake pressure 101.

FIG. 1B schematically shows the brake system 100 with the service brake released, in accordance with an embodiment. In this example, the first valve 110 (parking brake valve) is in the actuated position in which both the first port 1 and second port 2 are closed. Accordingly, the parking brake is not in operation. The second valve 140 (service brake valve) is in the basic condition with pressure supplied to port 3 and to the brake cylinder 103 via port 2, thereby at least partially disengaging the brake 102 if the supply pressure is adequately high. For example, the second valve 140 is fully moved to the basic position to deliver pressure to the brake cylinder 103 and disengage the brake 102, such as shown at the left side of FIG. 1B. Actuators 112, 142 are configured as "pull" actuators in this example.

Figure 2:
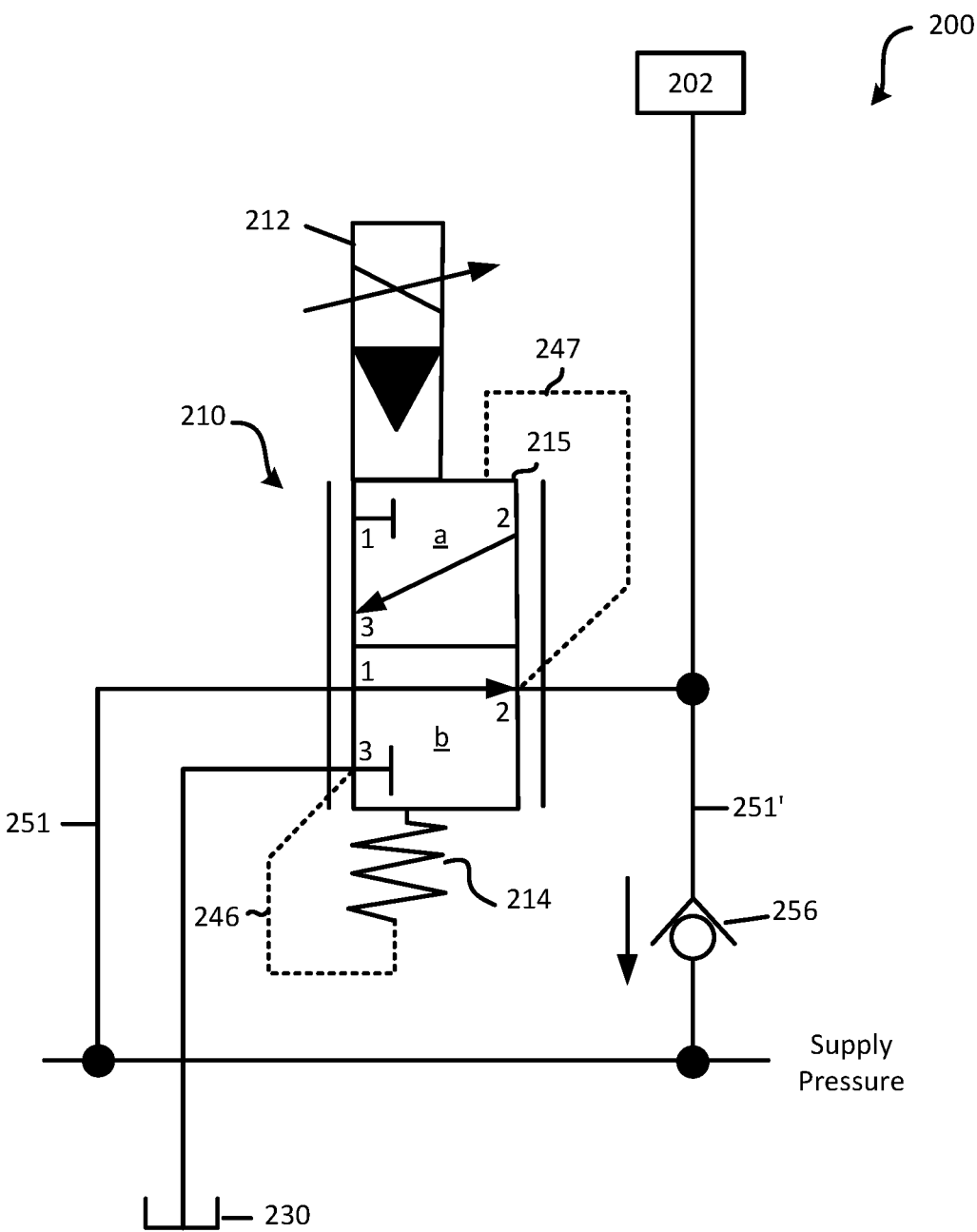
FIG. 2 schematically illustrates an electro-hydraulic brake system, in accordance with an embodiment of the present disclosure.

FIG. 2 schematically illustrates a braking system 200 with a brake 202 and an electro-hydraulic brake valve 210, in accordance with an embodiment of the present disclosure. In this example, the brake valve 210 has an integrated slave portion for control of service braking. In one embodiment, the brake valve 210 can be configured as a screw-in cartridge valve.

The brake valve 210 is configured as a 3-port, 2-position, normally open (NO), directional control valve with proportional control. The brake valve 210 has a hydraulically actuated, variable solenoid 212 with a spring return 214. In one embodiment, the solenoid 212 is variably actuated to provide gradual release of the brake 202. A sense line 246 connects port 3 to tank 230. Thus, pressure at port 3 is vented to tank 230. A sense line 247 connects port 2 (working port) to the actuator-end of the valve spool to control actuation. Thus, pressure at port 2 results in actuation or partial actuation towards the actuated position a. A check valve 256 is provided to dump pressure from the brake 202 to the supply pressure, which can be vented.

Figure 3:
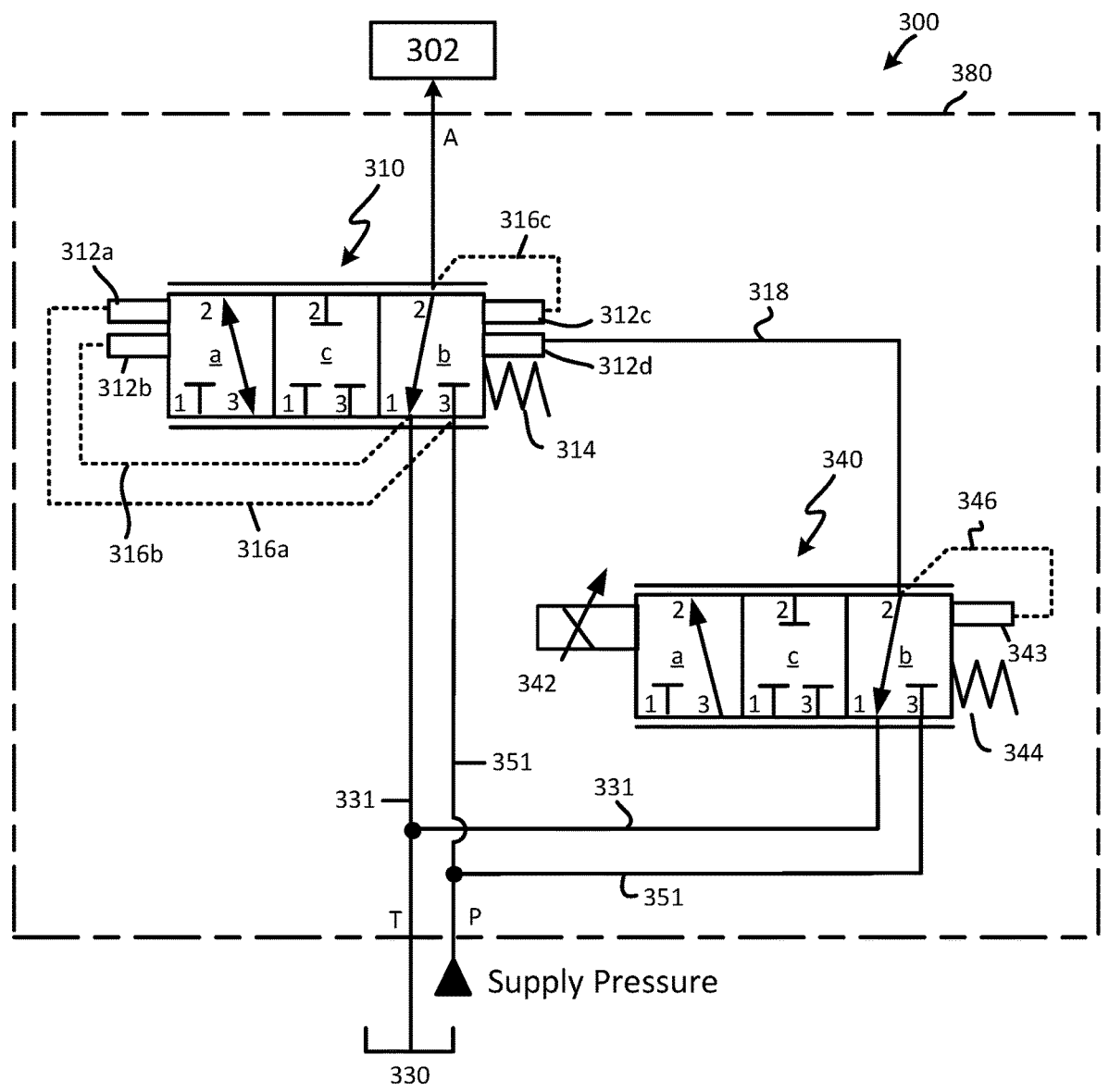
FIG. 3 schematically illustrates an electro-hydraulic brake system, in accordance with another embodiment of the present disclosure.

In the normally open or basic position b, shown in FIG. 3, pressure from the supply line 251 is provided to port 1 and flows through the brake valve 210 at working port 2 to operate (e.g., release) the brake 202 (e.g., a SAHR brake). In the basic position b, working port 2 also communicates via sense line 247 with the valve body 215 to assist in actuation of the brake valve 210. For example, in the event of excessive working pressure at working port 2, the sense line 247 is used to actuate or partly actuate the brake valve 210 toward the actuated position a, thereby reducing the delivery pressure to the brake 202.

In the actuated condition a, port 1 is closed to supply pressure and pressure from the brake 102 (and supply line 251') is dumped to the tank 230 through the brake valve 210 using ports 2 and 3. Since the brake valve 210 is configured as a proportional control valve, the pressure provided to the SAHR brake 102 is proportional to the position of the valve spool. Similarly, in the event of power loss, the brake valve

210 assumes the basic position b and pressure is dumped through the check valve 256, resulting in the brake 202 being applied.

FIG. 3 schematically illustrates a braking system 300 for a SAHR brake in accordance with another embodiment of the present disclosure. In this example, the braking system 300 includes a relay valve 310 and an electro-hydraulic pilot valve 340. The relay valve 310 is configured as a 3-port, 3-position proportional control valve with spring reset and electrical actuation. In a first or actuated position a, the relay valve 310 flow can occur in either direction through the valve via port 2 (working) and port 3 (pressure supply); port 1 (tank) is closed. In the center position c, all ports 1-3 are closed. In the second or basic position b, (as shown) pressure flows from the brake 302 to relay valve 310 at port 2 and exits via port 1 to the tank 330. The relay valve 310 is configured to dump pressure from the brake 302 to tank 330 when in the basic position b. In contrast to the system 200 shown in FIG. 2, braking system 300 does not require a check valve between the pressure supply and the brake 302 to rapidly dump pressure and apply the brake 302. Thus, in the event of a power loss, the relay valve 310 assumes the basic position b due to force of the return spring 314 and vents pressure from the brake 302 to the tank 330.

As shown in this example, the relay valve 310 includes a plurality of hydraulic actuators 312 that act on the valve spool to move it between the actuated position a, center position, and basic position b. In more detail, first and second actuators 312a, 312b act individually or together on the valve spool to move the relay valve 310 towards the actuated position a; third and fourth actuators 312c, 312d act individually or together on the opposite end of the valve spool to move the relay valve 310 towards the basic position b. The relay valve 310 also includes a return spring 314.

In the basic position b as shown in FIG. 3, a first sense line 316a connects port 3 (supply pressure) to the first actuator 312a. Thus, supply pressure is used to control actuation of the first actuator 312a. A second sense line 316b connects port 1 (tank 330) to the second actuator 312b. A third sense line 316c connects port 2 (working/brake) to the third actuator 312c. Thus, pressure from the brake 302 at port 2 is used to control actuation of the third actuator 312c. Pressure from the pilot line 318 is received at the fourth actuator 312d. Thus, pressure provided from the pilot valve 340 is used to control actuation of the fourth actuator.

When the valve spool of the relay valve 310 is in the second or basic position b as shown, pressure from the brake 302 is dumped to tank 330 by flow through port 2 to port 1, thereby actuating the brake 302 (a SAHR brake). Pressures at port 3 and port 1 are used by the first actuator 312a and the second actuator 312b, respectively, to at least partially control actuation of the valve spool. Actuation at the third actuator 312c is based upon third sense line 316c and actuation at the fourth actuator 312d is based on pressure provide from the pilot valve 340 via pilot line 318. Actuators 312a-312d can be balanced to provide the desired control of valve spool position in the relay valve 310.

The pilot valve 340 is connected to the fourth actuator 312d of relay valve 310 via pilot line 318. Pressure in the pilot line 318 is used to control the fourth actuator 312d. In the example shown, the pilot valve 340 is configured as a 3-port, 3-position proportional control valve that includes an electrically actuated variable solenoid 342, a spring return 344, and a sense line 346 between port 2 and actuator 343. The pilot valve 340 is operable between a first position a and a second position b (shown), and has a closed center position c. In the first or actuated position a, port 1 to tank 330 is closed and flow from the supply pressure 351 is through the valve from port 3 to port 2. In such case, supply pressure is provided to the fourth actuator 312*d* via pilot line 318. In the second or basic position b, port 3 is closed to supply pressure and pressure in the pilot line 318 is vented to tank through the pilot valve 340 from port 2 to port 1. Pressure at port 2 of the pilot valve 340 in the basic position b can be used to control actuation of actuator 343. For example, pressure at port 2 actuates actuator 343 to assist the spring return 344 to move the valve spool to the basic position b.

When the pilot valve 340 is in the first or actuated position a, supply pressure from the pressure supply line 351 is provided through the pilot valve 340 from port 3 to port 2 and is received at fourth actuator 312*d* of the relay valve 310. In the second or basic position b (as shown), pressure in the pilot line 318 is vented to tank 330 and/or is used to control actuation of actuator 343 to maintain the basic position b.

In the event of an emergency, such as a power failure or other event that disrupts electrical control of the relay valve 310 and pilot valve 340, the relay valve 310 assumes the basic position b as a result of the spring 314 return. In this basic position, pressure from the brake 302 dumps to the tank 330 through the relay valve 310, setting the brake 302. Similarly, without electrical power, the pilot valve 340 assumes the basic position b due to the spring return 344. In this basic position, port 3 of the pilot valve 340 is closed to supply pressure. Pressure in the pilot line 318 is vented through the pilot valve 340 from port 2 to port 1, then to the tank 330 via tank line 331.

Figure 4:
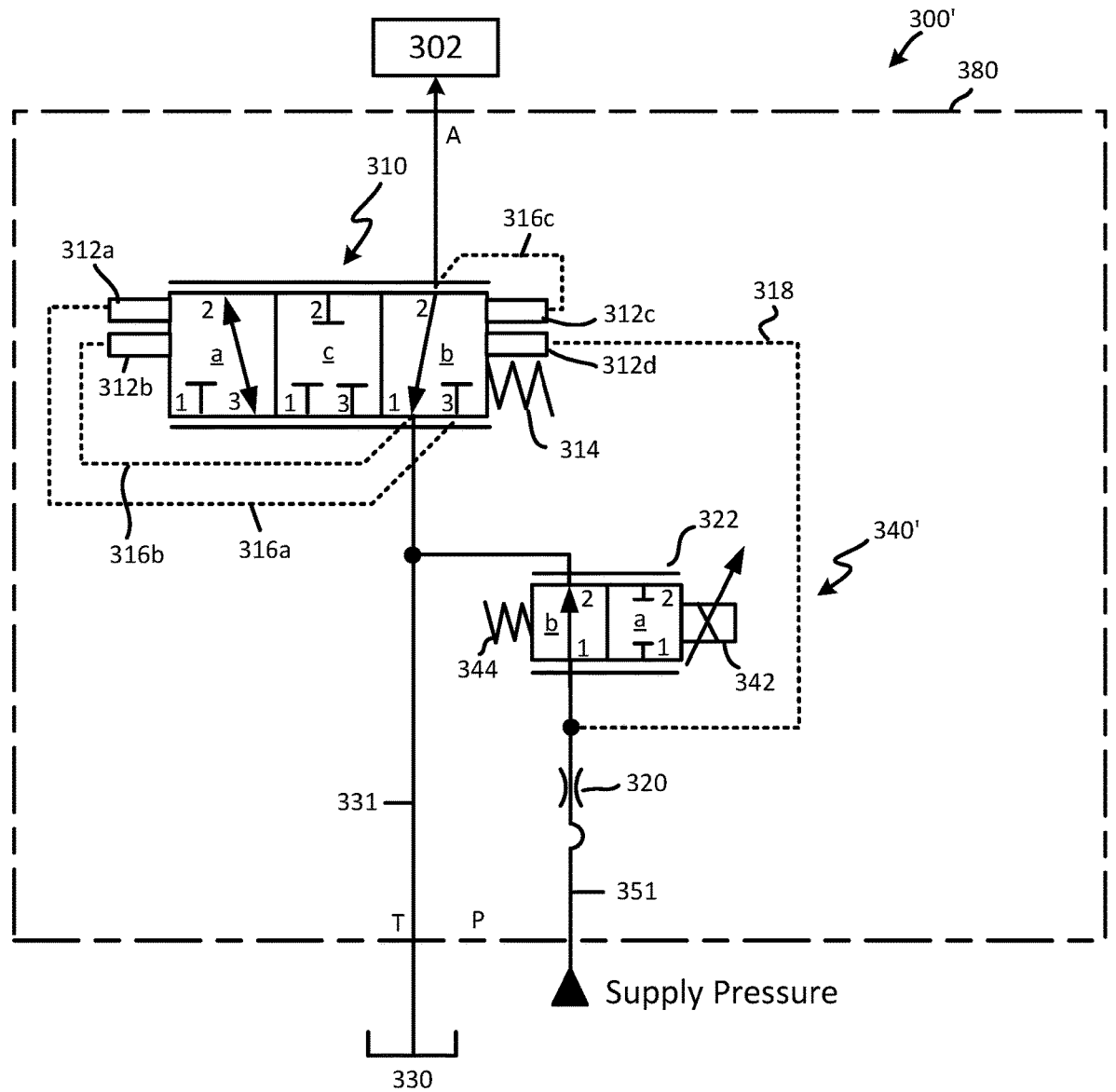
FIG. 4 schematically illustrates an electro-hydraulic brake system where the pilot valve is configured as a flow divider, in accordance with another embodiment of the present disclosure.

FIG. 4 schematically illustrates braking system 300 where the pilot valve 340' is configured as a flow divider, in accordance with another embodiment of the present disclosure. In this example, the pilot valve 340 includes a fixed orifice 320 and a variable orifice 322, a configuration which can be referred to as a flow divider. The variable orifice 322 is configured as a proportional flow valve that includes a solenoid actuator 342 and a spring return 344. In a basic position b, the variable orifice 322 is open with the supply pressure connected to port 1 and passing through the valve via port 2 to tank 330. In an actuated position a, port 1 and port 2 of the variable orifice 322 are closed. In one such embodiment, the pilot valve 340' optionally includes a filter upstream of the fixed orifice, as needed, to reduce or eliminate particulate contamination. The pilot line 318 connects to the pressure supply line 351 between the fixed orifice 320 and the variable orifice 322, and the pilot line communicates with the fourth actuator 312*d* of the relay valve 310. Thus, actuation of the fourth actuator 312*d* can be controlled using hydraulic pressure in the pilot line 318. Numerous variations and embodiments will be apparent in light of the present disclosure.

In some embodiments, the relay valve 310 and pilot valve 340, 340' are part of a single valve manifold 380, indicated by the dash-dot line surrounding these valves in FIG. 3 and FIG. 4. In other embodiments, the relay valve 310 and pilot valve 340, 340' are distinct valves connected to one another using hydraulic lines, for example.

Advantageously, braking system 300 is configured to dump pressure from the brake 302 to the tank 330 without a direct pressure supply line to the brake 302 and associated check valve in that direct supply line, such as shown in FIG. 2. When used in an underground mining machine or other large industrial equipment having a SAHR brake, the braking system 300 dumps brake pressure in an emergency to actuate the brake 302 and stop the machine.

Also, unlike other electro-hydraulic brake systems that have a return spring with spring force (about 1700 N) sufficient to counter the pressure of fully disengaging the SAHR brake (e.g., about 110 bar), the return spring 314 in the braking system 300 of the present disclosure has a spring force that is much less than that needed to overcome the pressure to fully disengage the brake. For example, the spring force can be about 2% of force of pressure needed to fully disengage the SAHR brake 202. For example, for a disengage pressure of 110 bar and a valve spool diameter of 0.5 inch, the return spring 314 of the relay valve 310 is 100 N or less, including 50 N or less, 30 N or less, 25 N or less, 20 N or less, about 15 N, from 5-15 N, from 10-20 N, from 10-30 N, from 20-50 N, and up to 100 N.

FURTHER EXAMPLE EMBODIMENTS

The following examples pertain to further embodiments, from which numerous permutations and configurations will be apparent.

Example 1 is an electro-hydraulic valve assembly. The valve assembly includes a relay valve having a floating valve spool movable between a first valve position, a second valve position, and a center valve position using hydraulic actuation and spring return. The relay valve defines a tank port, a working port, a pressure supply port. First actuators are arranged to act on a first end of the floating valve spool and second actuators are arranged to act on an opposite second end of the floating valve spool. One of the second actuators is configured and arranged to receive hydraulic pressure from a pilot valve. When in the first valve position, the pressure supply port communicates with the working port and the tank port is closed. When in the second valve position, the pressure supply port is closed and the pressure supply port communicates via a first sense line with one of the first actuators, the working port directs pressure to the tank port, the tank port communicates via a second sense line with another of the first actuators, and the working port communicates via a third sense line with one of the second actuators. When in a central position, the tank port, the working port, and the pressure supply port are closed.

Example 2 includes the valve assembly of Example 1 and includes the pilot valve. In one example the pilot valve has a working port in communication with one of the second actuators of the relay valve. In this way, actuation of the respective second actuator is controlled.

Example 3 includes the valve assembly of Example 2, where the relay valve and the pilot valve are part of a single valve manifold.

Example 4 includes the valve assembly of Example 2 or 3, where the pilot valve is configured as a flow divider.

Example 5 includes the valve assembly of Example 2 or 3, where the pilot valve has a pilot valve spool operable between a first position, a second position, and a center position. The pilot valve defines a tank port, a pressure supply port, and a working port, and includes a solenoid actuator configured to act on a first end of the pilot valve spool, a return spring acting on a second end of the pilot valve spool, and a hydraulic actuator configured to act on a second end of the pilot valve spool based on pressure at the working port when the pilot valve spool is in the second position. When in the first position, the tank port is closed, the pressure supply port communicates with the working port, and the working port communicates with one of the second actuators of the relay valve. When in the second position, the pressure supply port is closed, the working port communicates with the tank port, and the working port communicates via a pilot sense line with the hydraulic actuator on the second end of the valve spool. When in the center position, the tank port, the pressure supply port, and the working port are closed.

Example 6 includes the valve assembly of Example 5, where in the absence of electrical power, the pilot valve spool assumes the second position and the valve spool of the relay valve assumes the second position. In such condition and when used with a SAHR brake coupled to the working port of the relay valve, pressure at the SAHR brake dumps to tank, engaging the brake.

Example 7 includes the valve assembly of Example 6, where the relay valve and the pilot valve are part of a single valve manifold.

Example 8 includes the valve assembly of any one of the foregoing Examples, where when a supply pressure is at least 120 bar, the return spring has a spring force of no greater than 100 N.

Example 9 includes the valve assembly of Example 8, wherein the spring force is no greater than 50 N.

Example 10 includes the valve assembly of Example 8, wherein the spring force is no greater than 25 N.

Example 11 includes the valve assembly of any of the foregoing Examples, where the relay valve is configured as a proportional flow control valve.

Example 12 includes the valve assembly of any of the foregoing Examples, where in the absence of electrical power to the relay valve, the valve spool assumes the second position.

Example 13 is a SAHR brake system comprising the electro-hydraulic valve assembly of any of the foregoing Examples.

Example 14 is a vehicle comprising the SAHR brake system of Example 13.

Example 15 is the vehicle of Example 14 configured as an underground mining vehicle.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. An electro-hydraulic valve assembly comprising:
a relay valve having a floating valve spool movable between a first valve position, a second valve position, and a center valve position using hydraulic actuation and spring return, the relay valve defining a tank port, a working port, a pressure supply port, the relay valve having first actuators configured to act on a first end of the floating valve spool and second actuators configured to act on an opposite second end of the floating valve spool;
wherein one of the second actuators is configured to receive hydraulic pressure from a pilot valve;
wherein in the first valve position, the pressure supply port communicates with the working port and the tank port is closed;
wherein in the second valve position, the pressure supply port is closed and the pressure supply port communicates via a first sense line with one of the first actuators, the working port directs pressure to the tank port, the tank port communicates via a second sense line with another of the first actuators, and the working port communicates via a third sense line with one of the second actuators; and wherein in the center position, the tank port, the working port, and the pressure supply port are closed.

2. The electro-hydraulic valve assembly of claim 1, further comprising the pilot valve, the pilot valve having a working port in communication with one of the second actuators of the relay valve.

3. The electro-hydraulic valve assembly of claim 2, wherein the relay valve and the pilot valve are part of a single valve manifold.

4. The electro-hydraulic valve assembly of claim 2, wherein the pilot valve is configured as a flow divider.

5. The electro-hydraulic valve assembly of claim 2, wherein the pilot valve has a pilot valve spool operable between a first position, a second position, and a center position, the pilot valve defining a tank port, a pressure supply port, and a working port, the pilot valve comprising:
a solenoid actuator configured to act on a first end of the pilot valve spool;
a return spring acting on a second end of the pilot valve spool; and
a hydraulic actuator configured to act on a second end of the pilot valve spool based on pressure at the working port when the pilot valve spool is in the second position;
wherein in the first position, the tank port is closed, the pressure supply port communicates with the working port, and the working port communicates with one of the second actuators of the relay valve;
wherein in the second position, the pressure supply port is closed, the working port communicates with the tank port, and the working port communicates via a pilot sense line with the hydraulic actuator on the second end of the valve spool; and
wherein in the center position the tank port, the pressure supply port and the working port are closed.

6. The electro-hydraulic valve assembly of claim 5, wherein in absence of electrical power, the pilot valve spool assumes the second position and the valve spool of the relay valve assumes the second position.

7. The electro-hydraulic valve assembly of claim 6, wherein the relay valve and the pilot valve are part of a single valve manifold.

8. The electro-hydraulic valve assembly of claim 1, wherein when a supply pressure is at least 120 bar, the return spring has a spring force of no greater than 100 N.

9. The electro-hydraulic valve assembly of claim 8, wherein the spring force is no greater than 50 N.

10. The electro-hydraulic valve assembly of claim 8, wherein the spring force is no greater than 25 N.

11. The electro-hydraulic valve assembly of claim 1, wherein the relay valve is configured as a proportional flow control valve.

12. The electro-hydraulic valve assembly of claim 1, wherein in absence of electrical power to the relay valve, the valve spool assumes the second position.

13. A SAHR brake system comprising the electro-hydraulic valve assembly of claim 1.

14. A vehicle comprising the SAHR brake system of claim 13.

15. The vehicle of claim 14, wherein the vehicle is configured as an underground mining vehicle.

\* \* \* \* \*